(12) United States Patent
Goldberger

(10) Patent No.: US 6,914,770 B1
(45) Date of Patent: Jul. 5, 2005

(54) SURFACE MOUNT FLIPCHIP CAPACITOR

(75) Inventor: Haim Goldberger, Modi'in (IL)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 10/792,135

(22) Filed: Mar. 2, 2004

(51) Int. Cl.⁷ .......................... H01G 9/145; H01G 4/06
(52) U.S. Cl. ..................... 361/528; 361/524; 361/532
(58) Field of Search ................... 361/523–525, 361/528–529, 532–541

(56) References Cited

U.S. PATENT DOCUMENTS

| | | | |
|---|---|---|---|
| 3,440,495 A | * | 4/1969 | Howard et al. ............. 361/529 |
| 4,090,231 A | * | 5/1978 | Millard et al. ............. 361/529 |
| 4,984,130 A | | 1/1991 | Düll et al. |
| 5,986,877 A | * | 11/1999 | Pathare et al. ............. 361/508 |
| 6,238,444 B1 | | 5/2001 | Cadwallader |
| 6,380,577 B1 | | 4/2002 | Cadwallader |
| 6,400,556 B1 | * | 6/2002 | Masuda et al. ............. 361/523 |
| 6,410,083 B1 | | 6/2002 | Pozdeev-Freeman |
| 6,541,302 B2 | | 4/2003 | Huber et al. |

\* cited by examiner

Primary Examiner—Eric W. Thomas
(74) Attorney, Agent, or Firm—McKee, Voorhees & Sease, P.L.C.

(57) ABSTRACT

The surface mount flipchip capacitor of the present invention includes a wire and a conductive powder element electrically connected to the wire. The surface mount flipchip capacitor has insulative material surrounding at least a portion of the conductive powder element and the wire extending below the conductive powder element. A first terminal is formed on the surface mount flipchip capacitor at the first end surface of the wire and a second terminal is formed by being electrically connected to the conductive powder element. The surface mount flipchip capacitor of the present invention is created by methods which include the steps of providing a wire and placing conductive powder upon the wire. One embodiment of the present invention creates multiple wires from a foil sheet and electrophoretically deposits conductive powder element upon the wire.

20 Claims, 5 Drawing Sheets

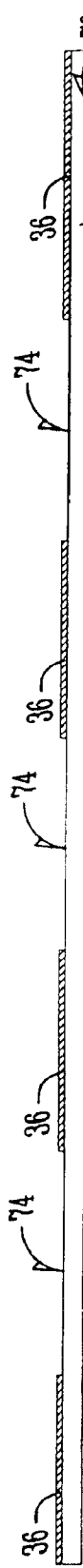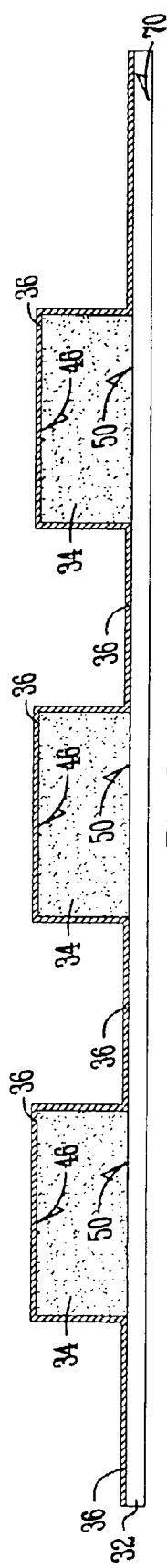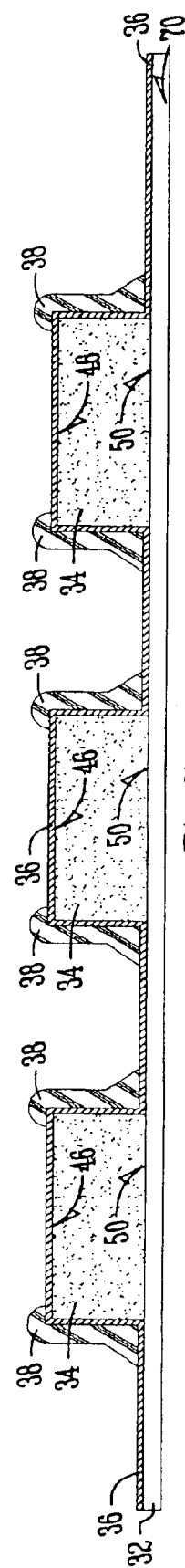

United States Patent No. US 6,914,770 B1

SURFACE MOUNT FLIPCHIP CAPACITOR

BACKGROUND OF THE INVENTION

The present invention relates to capacitors. More particularly, though not exclusively, the present invention relates to improved surface mount flipchip capacitors and methods for manufacturing the same.

BRIEF SUMMARY OF THE INVENTION

Capacitors exist in the art which are made from a capacitive element such as a tantalum slug or pellet. To create a conventional tantalum slug, tantalum powder is pressed with a binder and then exposed to a process for forming a polarized capacitor having a positive end and a negative end. A typical tantalum slug will have an anode comprised of a wire extending from the slug and a cathode comprised of a conductive surface formed at the opposite side of the tantalum slug.

The usual method for making tantalum pellets for use in tantalum capacitors includes steps wherein tantalum powder is first pressed or compacted into a pellet. The resulting pressed pellets then undergo a sintering process wherein the pellets are heated in a vacuum. The heating allows the tantalum particles to stick together so they can hold a lead wire, which functions as the anode.

Following the sintering process, the tantalum pellet is dipped in an acid solution to form a dielectric film on the outer surface of the pellet and the particles within the pellet which is typically tantalum pentoxide. The pellet and the particles within the pellet are then subsequently coated with various other metal-containing materials which form the cathode.

These capacitors have the anode and the cathode attached to a circuit board by connection wires.

Modem methods of mounting components use the possibility of soldering the components directly to conductor tracks of printed circuit boards without the use of connection wires. This technology is used to an ever increasing extent under the indication "Surface Mounted Device" (SMD).

Capacitors suitable for the SMD technique may be manufactured as a chip component and as a MELF component. Chip components generally have supporting members in the form of rectangular parallelepipeds which have end faces suitable for soldering or in the form of flipchips which have a face with both cathode and anode terminals suitable for soldering. MELF (Metal Electrode Face Bonding) components start from cylindrical supporting members having connection caps in which the connection wires are omitted and the caps themselves are made suitable for soldering at their surfaces by an electroplating treatment and are soldered directly with said connection caps to conductor tracks of printed circuit boards.

The great advantage of the SMD technology is that extremely high packing densities of components on the printed circuit boards are possible. For realizing ever increasing densities, smaller and smaller components suitable for the SMD technique become necessary.

However, SMD technology encounters problems with producing devices with productivity and uniformity. It can therefore be seen that there is a need for an improved surface mount flipchip capacitor and method for making the same.

In addition, current SMD technology may require the manipulation of individual capacitors as opposed to using techniques for mass manipulation of capacitors. One particularly useful technique of mass manipulation is through the use of a reel to reel process. Therefore, a further feature of the present invention is the provision of a capacitor that is efficiently manufactured using a reel to reel process.

Also, current SMD technology may be improved by the use of electrophoretic deposition. Some of the advantages of electrophoretic deposition include a high coating rate of charged particles upon the substrate, a resulting film of charged particles upon the substrate that is dense and uniform, a thickness of film that is able to be controlled by depositing condition, and a simple process that is easy to scale up. Accordingly, a still further feature of the present invention is the provision of a method that uses electrophoretic deposition to increase the capacitor uniformity, tolerance, capacitance and the density per volume.

It is still a further feature of the present invention to provide a surface mount flipchip device that is easy to make and economical to manufacture.

The device and method of accomplishing these and other features will become apparent from the following description of the invention.

BRIEF DESCRIPTION OF THE DRAWINGS

FIGS. 2–10 are cross sectional views of the surface mount flipchip capacitor shown in FIG. 1 at various manufacturing stages.

DETAILED DESCRIPTION OF THE PREFERRED EMBODIMENT

The present invention will be described as it applies to the preferred embodiment. It is not intended that the present invention be limited to the described embodiment. It is intended that the invention cover all alternatives, modifications, and equivalencies which may be included within the spirit and scope of the invention.

Figure 11:
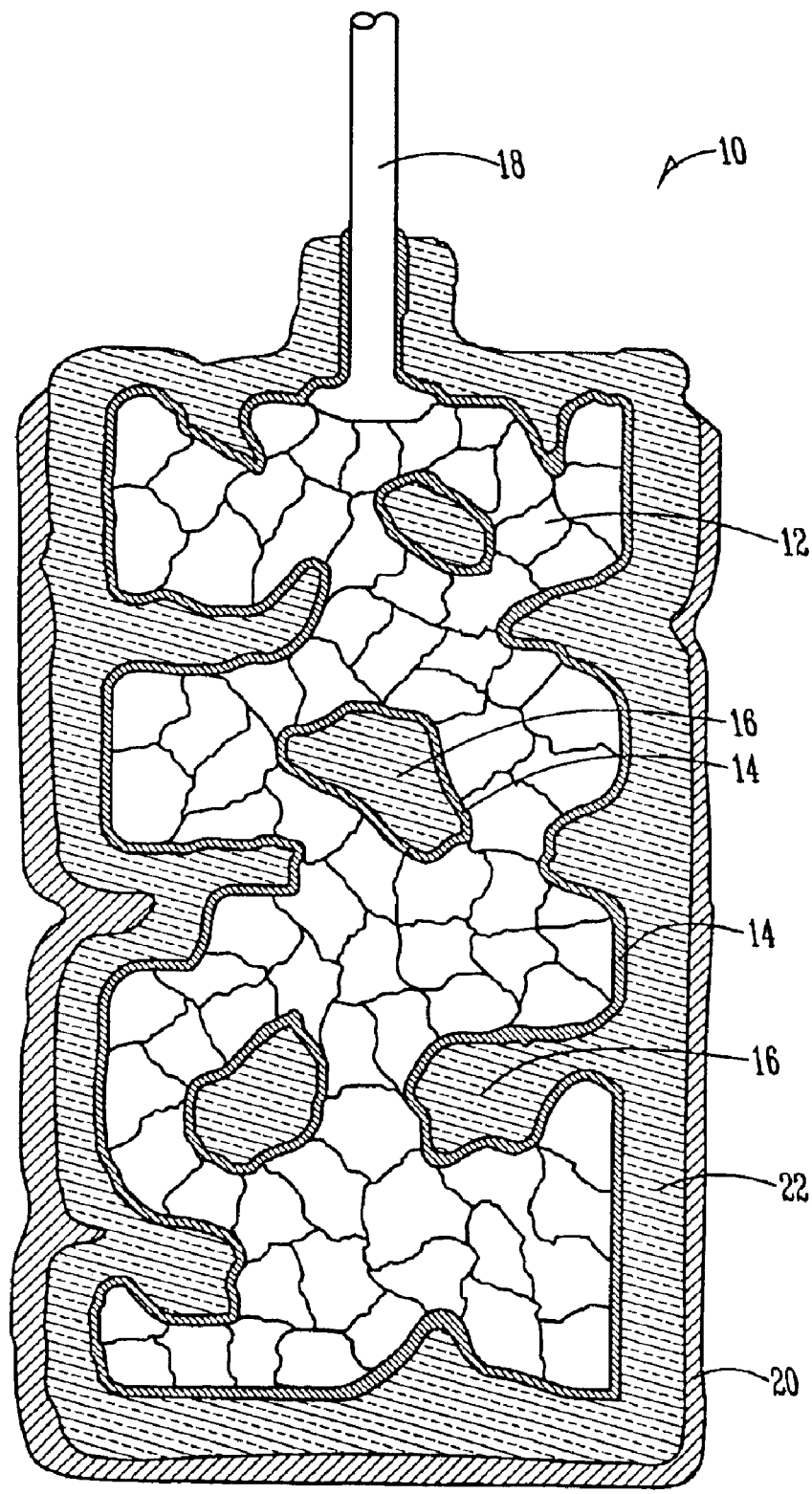
FIG. 11 is a schematic drawing of a prior art capacitor.

FIG. 11 shows a typical prior art capacitor 10. Capacitors are used in many types of electronic devices. The more popular uses for capacitors are in personal computers, disk drives, cellular phones, printers, hand held pagers, automobiles and in military equipment.

The capacitor 10, as shown, has two conductors, namely, the tantalum pellet 12 and the manganese dioxide ($MnO_2$) 16, which is actually a semiconductor. The dielectric film 14 is tantalum pentoxide ($Ta_2O_5$). When the capacitor 10 is in use, the tantalum pellet 12 is positively charged and acts as the anode, and the manganese dioxide 16 is negatively charged and acts as the cathode. The capacitor also includes a tantalum anode lead wire 18, a metallized outer electrode or silver 20 and a layer of carbon 22 inside the outer electrode 20.

The prior art capacitor 10 is usually made by taking tantalum powder and compressing or compacting into a pellet. The resulting pressed pellet 12 then undergoes a sintering process wherein the pellet 12 is heated in a vacuum. The heating allows the tantalum particles to stick together so they can hold the lead wire 18.

After the sintering process, the pellet 12 is typically dipped in an acid solution to form a dielectric film 14 on the outer surface of the pellet 12. The pellet 12 is then subsequently coated with various other metal-containing materials which form the cathode. Typically, $MnO_2$ 16 is placed around the dielectric film 14 which may be followed by the layer of carbon graphite 22 which is painted with silver print 20. Other conductive polymers such as polypirrolle can also be used in place of manganese oxide. The cathode portion ends in a cathode termination.

The lead wire 18 is usually coated with an insulating substance such as Teflon™ (not shown). The lead wire 18 is typically the anode termination. These terminations can be connected to a circuit board for mounting the capacitor 10 in an electrical circuit.

Figure 1:
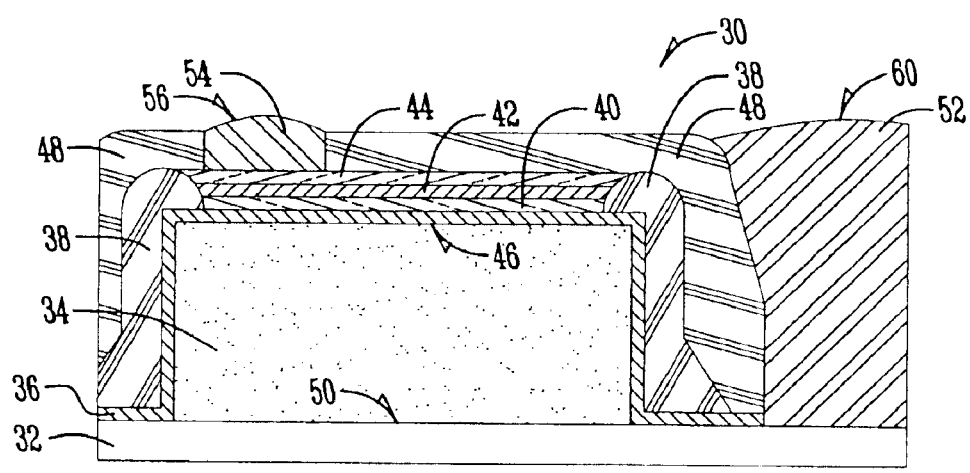
FIG. 1 is a side cross sectional view of a surface mount flipchip capacitor of the present invention.

FIG. 1 shows a surface mount flipchip capacitor 30 of the present invention. Note that in the figures, for clarity, the various portions of the capacitors are shown with straight and sharply cornered edges. The actual capacitors may have slightly rounded corners, etc. In addition, the capacitors have been shown in a standard shape and size; however, the shape and size may vary to include different lengths, widths, heights, size proportions of components, etc.

The capacitor 30 includes a wire 32. The wire 32 is typically made of tantalum. Alternatively, the wire may be made of another valve metal (i.e., Niobium (Nb), Hafnium (Hf), Zirconium (Zr), Titanium (Ti), Vanadium (V), Tungsten (W), Beryllium (Be), or Aluminum (Al)). Alternatively, the wire may be made of a substrate containing a valve metal (i.e., Ta, Nb, Hf, Zr, Ti, V, W, Be, or Al). The wire is preferably between 50–100 μm thick.

A conductive powder element 34 is upon the wire 32. The conductive powder element may be a valve metal. Alternatively, the conductive powder element may be a valve metal substrate. The conductive powder element 34 may have a low capacitor-voltage (CV) (i.e. 10 CV) up to 100–150 KCV. The conductive powder element 34 before being placed upon the wire 32 may be in a form of a powder that is regularly agglomerated, sieved, and/or crushed. The conductive powder element 34 has a density in the range of 3–8 g/cc when attached to the wire 32 in a layer.

A dielectric film 36 is over the surface of the conductive powder element 34 and the anode wire 32. The dielectric film 36 is typically tantalum pentoxide ($Ta_2O_5$). An insulative coating 38 such as Teflon™ coats a portion of the wire 32, the sides of the sintered tantalum layer 34, and a portion of the top of the sintered tantalum layer 34.

A solid electrolyte, i.e. manganese dioxide ($MnO_2$) or a conductive polymer is a dielectric cap 40. The solid electrolyte impregnates spaces within the dielectric film 36 coated conductive powder element 34 to form the cathode of the capacitor.

A conductive counterelectrode layer overlies the dielectric cap 40 and is in electrical continuity with the dielectric cap 40 of the capacitor 30. The counterelectrode layer is preferably comprised of a first sublayer 42 of graphite carbon and an overlayer of metal particles 44, preferably silver, in a binder or organic resin. The counterelectrode layer extends over the cathode end 46 of the tantalum layer 34 as well as helps seal the manganese dioxide layer 40. The counterelectrode layer overlies substantially all of the cathode end 46 of the tantalum layer 34 to obtain a capacitor having a minimum dissipation factor and ESR, but is maintained separate from, and out of electrical continuity with the anode wire 32.

An organic coating or passivation coating 48 is formed over the counterelectrode layer and over the insulative coating 38. A cathode end cap 54 is bonded in contact with counterelectrode layer through an opening in the passivation coating 48, thus forming a cathode terminal 56. An anode end cap 58 is bonded to the wire 32 which is in electrical continuity with the anode end 50 of the tantalum layer 34 and built up in height to make a side of the capacitor 30, thus forming an anode terminal 60 the same height as the cathode terminal 56.

The cathode terminal 56 and the anode terminal 60 are connections that can be connected to a circuit board for mounting the capacitor 30 in an electrical circuit. While the method described below and shown in FIGS. 2–10 below is applied to a capacitor, it is also possible to utilize the present method for any type of chip component requiring termination at the same end.

Figure 2:

FIG. 2 is a side view of a foil 70. The foil 70 is preferably 50–100 μm thick. The foil 70 may vary in length and width to accommodate any multiple of capacitors 30 in both the length or width or combination of the two. The foil 70 may be isolated into a wire 32 sized to accommodate a row of capacitors 30.

Figure 3:
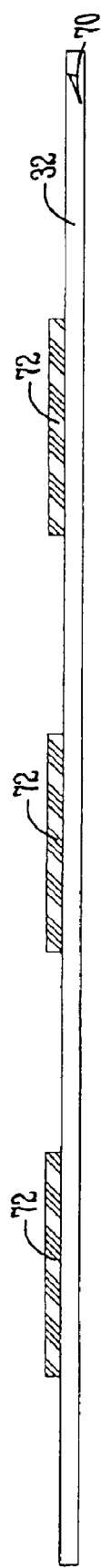
Figure 4:
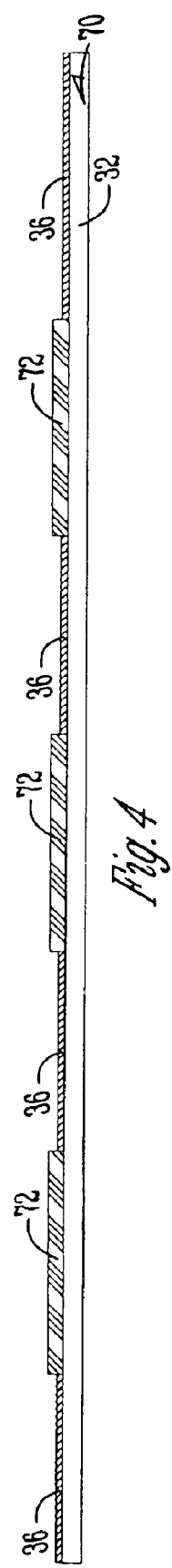

FIGS. 3, 4 and 5 are side views of the foil 70 being masked to limit an area for electrophoretic deposition. As seen in FIG. 3, first a mask layer 72 is placed on the foil 70. The mask layer 72 is patterned, using conventional photolithographic methods and may be a photoresist layer. As seen in FIG. 4, the foil is then oxidized creating a dielectric film 36. The mask layer 72 is then removed to expose an area 74 for electrophoretic deposition.

As seen in FIG. 6, the conductive powder element 34 is placed upon the foil 70 at area 74 by electrophoretic deposition that comprises essentially two steps: first, charged particles of powder (0.2–40 μm) in suspension are moved to the wire 32 by applied voltage and second, the particles of powder are deposited (discharged and flocculated) on the foil 70. The resulting film of charged particles is the conductive powder element 34 which is dense and uniform.

The next step is to place the foil 70 with conductive powder element through a sintering process to heat the conductive powder element 34 in a vacuum. The temperature for this process is between 600–1400° C. for tantalum and niobium. The conductive powder element 34 is held in a vacuum at the specified temperature for between about 2–20 minutes and then cooled in accordance with conventional cooling procedures that are well known in the art.

After the sintering process the conductive powder element 34 is placed in an oxygen-forming solution such that a thin dielectric film 36 is formed over the conductive powder element 34. As an example, when using tantalum or niobium powder the thin dielectric film 36 will be tantalum pentoxide or niobium pentoxide.

The next step in the process, as seen in FIG. 7, is the addition of a Teflon™ print or other insulating substance 38.

Figure 8:
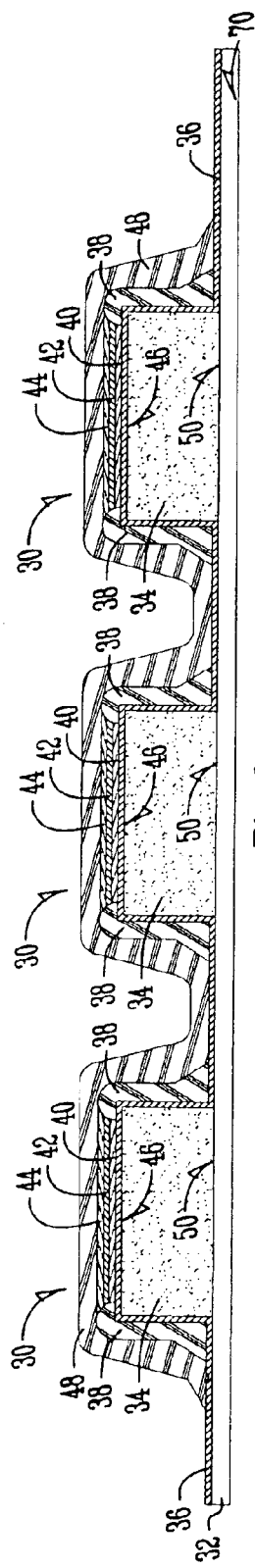

Next, as seen in FIG. 8, the cathode portion of the capacitor 30 is formed. Typically, manganese oxide 40 is placed upon the dielectric film 36 in the inner area defined by the insulating substance 38 which may be followed by a layer of carbon graphite 42, and a layer of silver print 44. The silver print 44 is comprised of an organic resin heavily filled with silver flakes, making it conductive.

As further seen in FIG. 8, an insulation or passivation material 46 is placed surrounding the silver print layer 44 and the insulating substance 38.

Figure 9:
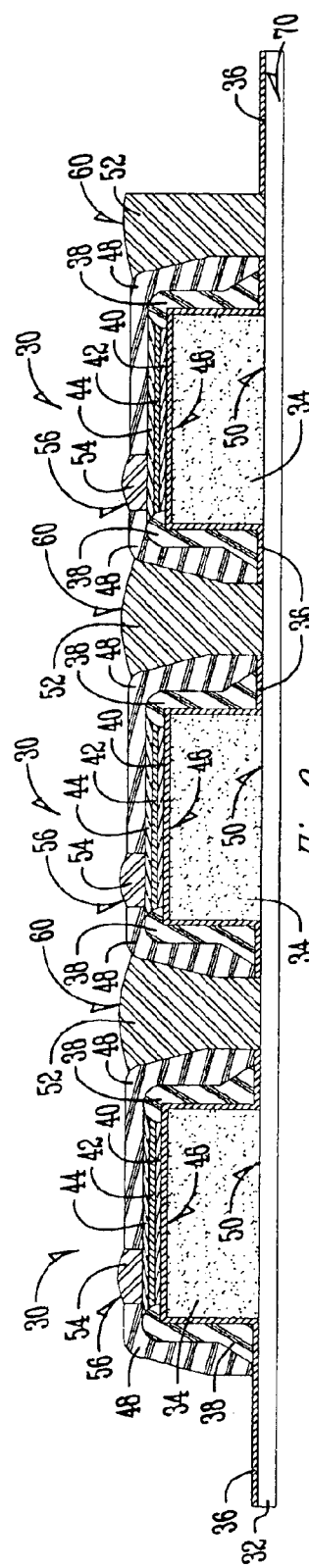

As seen in FIG. 9, the anode is laser opened to remove the passivation material 46 and the dielectric film 36 to expose the wire 32. While laser opening is the preferred method to expose the conductive surface of the wire 32, other techniques could be used.

With any process, the conductive surface of the wire 32 should be exposed. Once the wire 32 is exposed, anode end cap 52 can be applied through silver printing to become the anode terminal 60. In addition, the cathode is laser opened through the insulating substance and a cathode end cap applied through silver printing.

Figure 10:
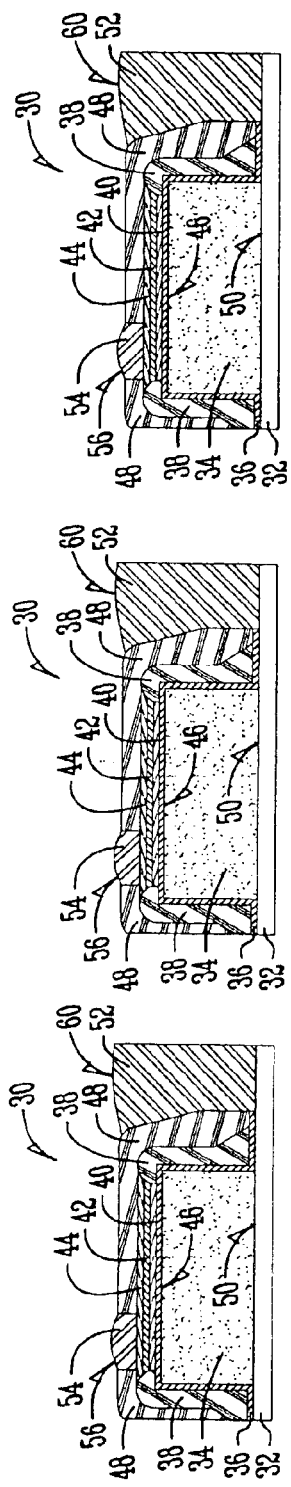

The next step is to cut from the surface mount chip capacitor 30 from the foil 70, as seen in FIG. 10. The surface mount chip capacitor 30 may be removed from the foil 70 a number of ways well known in the art to then possess individual wire 32.

While the present invention can be accomplished using the methods described above, it us understood that various other methods could be used within the spirit and scope of the present invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A surface mount flipchip capacitor comprising:
   a wire having opposite first and second end surfaces and upper and lower face surfaces;
   a conductive powder element electrically connected to the wire and covering a portion of the wire upper face surface;
   the wire lower face surface being free from the conductive powder element;
   insulative material surrounding at least a portion of the conductive powder element and a portion of the wire upper face surface;
   a first terminal formed by a first body of conductive material disposed to the first end surface of the wire and a portion of the insulating material; and
   a second terminal formed by a second body of conductive material disposed over and being electrically connected to the upper end of the conductive powder element.

2. The surface mount flipchip capacitor of claim 1 wherein the first terminal is an anode end and the second terminal is a cathode end.

3. The surface mount flipchip capacitor of claim 1 wherein the conductive powder element is made of powder.

4. The surface mount flipchip capacitor of claim 3 wherein the powder is from the group consisting of: Ta, Nb, Hf, Zr, Ti, V, W, Be, and Al.

5. The surface mount flipchip capacitor of claim 3 wherein the powder is a substrate of a metal from the group consisting of: Ta, Nb, Hf, Zr. Ti, V, W, Be, and Al.

6. The surface mount flipchip capacitor of claim 3 wherein the powder has been electrophoretically deposited upon the wire.

7. The surface mount flipchip capacitor of claim 1 wherein the conductive powder element has a density between 3–8 g/cc.

8. The surface mount flipchip capacitor of claim 1 wherein the conductive powder element has a capacitance-voltage between 10 CV and 150 KCV.

9. The surface mount flipchip capacitor of claim 1 wherein the wire is a parallelepiped.

10. The surface mount flipchip capacitor of claim 1 wherein the wire lower face surface is uncovered.

11. A surface mount flipchip capacitor comprising:
    a wire having opposite first and second end surfaces and upper and lower face surfaces;
    a conductive powder element upon the wire covering a portion of only the upper face surface, the conductive powder element having a cathode end, an anode end, and conductive powder element sides extending between the anode and cathode ends;
    a layer of insulation material exterior of, and in covering relation over the cathode end and the conductive powder element sides, whereby the wire extends below and has a protruding wire portion extending beyond an exterior surface of the layer of insulation material;
    an anode layer of conductive material over the wire first end and a portion of the exterior surface of the insulation material so that the anode layer of conductive material is in electrical contact with the wire first end, whereby electrical continuity is achieved from the anode end of the conductive powder element, through the wire to the anode layer of conductive material;
    a cathode layer of conductive material over at least a portion of the cathode end of the conductive powder element approximately level with the anode layer of conductive material and in electrical contact with, the cathode end of the conductive powder element.

12. The surface mount flipchip capacitor of claim 11 wherein the conductive powder element is made of electrophoretically deposited powder.

13. The surface mount flipchip capacitor of claim 12 wherein the powder is from the group consisting of: Ta, Nb, Hf, Zr, Ti, V, W, Be, and Al.

14. The surface mount flipchip capacity of claim 12 wherein the powder is a substrate of a metal from the group consisting of: Ta, Nb, Hf, Zr, Ti, V, W, Be, and Al.

15. The surface mount flipchip capacitor of claim 11 wherein the conductive powder element has a density between 3–8 g/cc.

16. The surface mount flipchip capacitor of claim 11 wherein the conductive powder element has a capacitance-voltage between 10 CV and 150 KCV.

17. The surface mount flipchip capacitor of claim 11 wherein the wire is a parallelepiped.

18. The surface mount flipchip capacitor of claim 11 wherein the wire is a foil sheet portion.

19. The surface mount flipchip capacitor of claim 11 wherein the wire lower face surface is free from the conductive powder element.

20. The surface mount flipchip capacitor of claim 11 wherein the wire lower face surface is uncovered.

* * * * *

UNITED STATES PATENT AND TRADEMARK OFFICE
CERTIFICATE OF CORRECTION

PATENT NO. : 6,914,770 B1  
APPLICATION NO. : 10/792135  
DATED : July 5, 2005  
INVENTOR(S) : Haim Goldberger Page 1 of 1

It is certified that error appears in the above-identified patent and that said Letters Patent is hereby corrected as shown below:

Col. 5, line 40 should read:
to ~~the upper end of~~ the conductive powder element.

Col. 6, line 9 should read:
a wire having opposite first and second ~~end surfaces~~ends and Signed and Sealed this Sixth Day of May, 2008

JON W. DUDAS  
*Director of the United States Patent and Trademark Office*